United States Patent [19]

Joice et al.

[11] 4,259,134

[45] Mar. 31, 1981

[54] POLYMER FILM SLITTER-SEALER APPARATUS AND METHOD

[76] Inventors: Richard L. Joice, 23937 Hartland, Canoga Park, Calif. 91304; Joseph C. Adamo, 9931 Lurline Ave., #130, Chatsworth, Calif. 91311

[21] Appl. No.: 29,442

[22] Filed: Apr. 12, 1979

[51] Int. Cl.³ .................. B32B 31/00; B65C 9/25; B32B 31/18
[52] U.S. Cl. ................................. 156/251; 156/322; 156/515
[58] Field of Search .............. 156/515, 251, 322

[56] References Cited

U.S. PATENT DOCUMENTS

| | | | |
|---|---|---|---|
| 2,781,079 | 2/1957 | Ruby | 156/515 |
| 3,269,278 | 8/1966 | Olstad | 156/271 |
| 3,660,205 | 5/1972 | Taylor | 156/515 |
| 4,070,222 | 1/1978 | Olson | 156/515 |

*Primary Examiner*—Douglas J. Drummond
*Attorney, Agent, or Firm*—Allen M. Shapiro

[57] ABSTRACT

Slitter-sealer, for slitting two layers of thermoplastic polymer film and sealing the slit edges of adjacent layers together, has a preheater for preheating the polymer film before slitting to reduce the required temperature at the slitter and improve sealing.

9 Claims, 7 Drawing Figures

POLYMER FILM SLITTER-SEALER APPARATUS AND METHOD

BACKGROUND OF THE INVENTION

1. Field of the Invention

This invention is directed to a slitter-sealer apparatus for slitting multiple layers of thermoplastic polymer film and sealing the edges of adjacent layers together for bag-making, bag-sealing and similar operations with thermoplastic synthetic polymer composition film.

2. Brief Description of the Prior Art

Thermoplastic synthetic polymer composition film is folded, cut, edge-sealed and similarly processed for the automatic making of those receptacles commonly called "plastic bags." Such bags are used for the packing, storing and handling of a wide variety of products, with the food processing industry consuming a large amount of film and a large number of bags. In making such items, the film is produced and is wound on a supply roll in double thickness, with the edges already sealed or continuous so that the supply roll carries a wide tube. When it is desired to make two bags per width of tube, the double layer of film is advanced through a slitter which slits the multiple layers and, at the same time, seals the adjacent layers together to form a pair of narrower tubes. The slitter is a sharp bifurcated knife blade, and sealing is accomplished by heating the slitter. When operating at the normal high film speed, the slitter blade must be heated to a quite high temperature in order to raise the thermoplastic film to sealing temperature. One of the problems is that, with such a high temperature, the film is often locally overheated, causing crystallization which weakens the material at the joint. Also, the overheating often causes the film to be so soft and therefore weak immediately after passing the slitter that the forces occurring during rapid film travel cause separation or at least weakening of the joint. Thus, failure most often occurs at the sealed joint. There is need in the art to produce an improved polymer film slitter-sealer apparatus so that high-speed splitting and sealing can be accomplished with a reliable, strong seal joint.

SUMMARY OF THE INVENTION

In order to aid in the understanding of this invention, it can be stated in essentially summary form that it is directed to a polymer film slitter-sealing apparatus and method wherein the apparatus includes a preheater bar positioned to a preheat polymer film as it moves towards the slitter knife so that thermoplastic sealing is accomplished with slitting.

It is thus an object of this invention to provide a polymer film slitter-sealer apparatus wherein a preheater preheats layers of thermoplastic polymer film immediately before slitting so that sealing during slitting is enhanced. It is another object to provide a polymer film slitter-sealer wherein improved seal between layers of polymer film is achieved during slitting without overheating. It is a further object to provide a method of edge sealing of thermoplastic polymer film which includes a preheating step, as well as a hot slitting step of multiple layers so that the layers are slit and adjacent layers are joined. Additional objects include the attainment of the foregoing objectives in an economical and reliable manner.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description taken in conjunction with the accompanying drawings.

FIG. 5 is an enlarged section taken generally along the line 5—5 of FIG. 2, with parts broken away.

DESCRIPTION OF THE PREFERRED EMBODIMENTS

Figure 1:
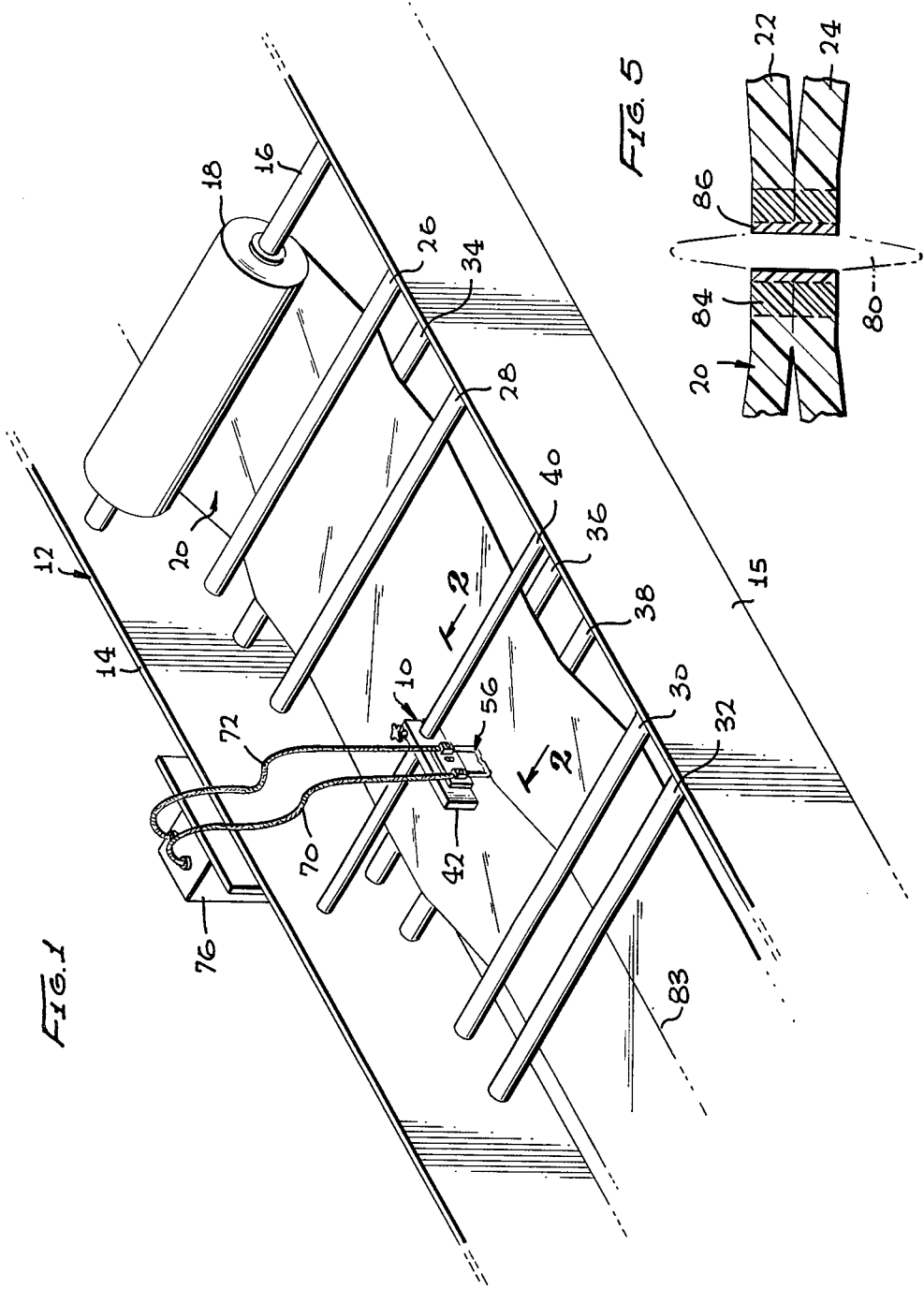
FIG. 1 is an isometric view of a slitter-sealer apparatus for thermoplastic polymer films incorporating the preheating apparatus of this invention.
Figure 2:
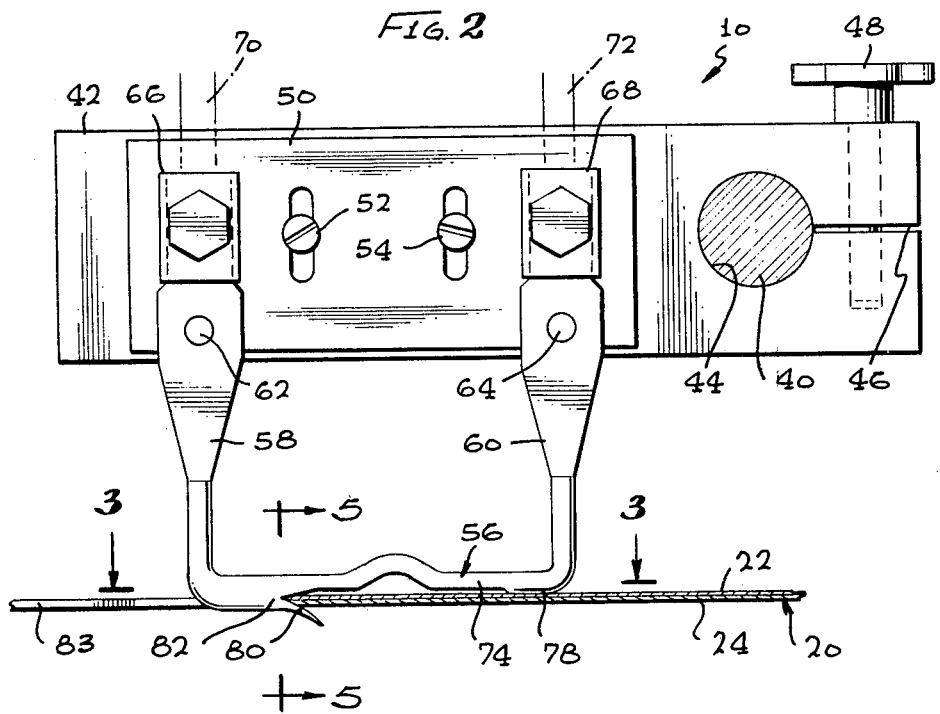
FIG. 2 is an enlarged sectional view taken generally along the line 2—2 of FIG. 1, with parts taken in section and parts broken away.

The polymer film slitter-sealer apparatus of this invention is generally indicated at 10 in FIGS. 1 and 2. The slitter-sealer apparatus 10 is used in a structure wherein a polymer film is advanced. The structure 12 is one type of film-handling equipment in which the apparatus 10 can be used. Side frames 14 and 15 provide support for supply roll shaft 16 on which supply roll 18 is mounted. Supply roll 18 is a wound-up tube of thermoplastic synthetic polymer composition film material often polyethylene. It is unwound through structure 12 as film web 20. As is seen in FIGS. 2 and 5, film web 20 is comprised of upper layer 22 and lower layer 24. These layers are usually secured together at their edges so that film web 20 is a tubular structure. Web 20 passes under guide bars 26, 28, 30 and 32 and over guide bars 34, 36 and 38. The guide bars 26 through 38 are illustrative of means for controlling the web, and a different illustrative of means for controlling the web, and a different arrangement thereof may be employed. The web is advanced by any convenient means such as a web winder or a bag maker.

Support bar 40 is secured to side frames 14 and 15. Bracket 42 is bored at 44 and slotted at 46 so that clamp screw 48 can secure braket 42 at any position along the length of support bar 40 to determine the cut and sealing line and at any desired rotative angle. Dielectric base 50 is attached to bracket 42 by means of screws 52 and 54 engaging through slotted holes in the dielectric base. In that way, dielectric base 50 can be positioned on bracket 42.

Slitter-sealer bar 56 is U-shaped. It has upright legs 58 and 60 which are secured to dielectric base 50 by fasteners 62 and 64, which may be screws or rivets engaged in dielectric base 50, but not in contact with bracket 42. Connectors 66 and 68 are formed on the top of upright legs 58 and 60 and are for the connection of electric leads 70 and 72, respectively, see FIG. 1.

Figure 3:
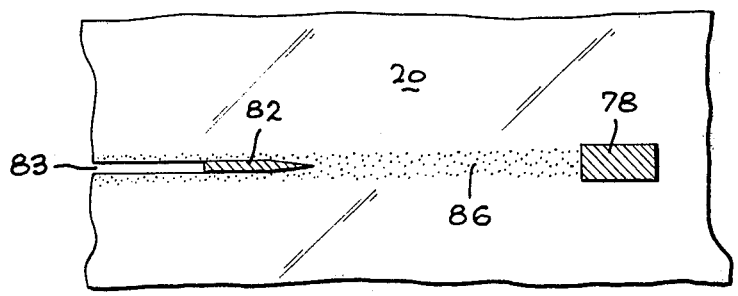
FIG. 3 is a horizontal section through the slitter-sealer taken generally along the line of 3—3 FIG. 2.

Heater bar 74 is contiguously formed with legs 58 and 60. As is conventional, the entire slitter-sealer bar 56 is made of electrically conductive metal so that, when electricty is passed therethrough, it is heated. Power supply 76, shown in FIG. 1, supplies the proper current for the desired degree of heating. Bar 56 is made of a suitable material with an appropriate resistance for heaing and is also capable of being shaped, hardened, and sharpened to a sharp edge. Bar 74 is formed in accordance with this invention so that heater pad 78, see FIGS. 2 and 3, is positioned to lie in direct contact with one surface of the film web 20 as it is advanced past the slitter-sealer bar. Heat is conductively conveyed from bar 74 to film web 20 by means of heater pad 78. Behind heater pad 78 in the direction of movement of film web 20, bar 74 is provided with a knife with a downwardly turned tine 80. The throat between the main part of bar 74 and tine 80 is sharpened (see FIG. 3) in the conventional manner so that, as the web 20 is advanced, it is also slit. The bifurcated knife 82 with the sharp throat slits the advancing film web 20. The slit and seal line is indicated at 83 in FIGS. 1 and 3.

The inventive heater pad 78 provides enough preheat to cause fusing between the layers 22 and 24. The preheat zone 84, see FIG. 5, is partly sealed by the preheat. When the heated, bifurcated knife 82 accomplishes the slitting, then sealing between the layers in the seal zone 86 is further accomplished and is further assured by the fact that the advancing film web was first preheated and then was slit with a hot, bifurcated slitting knife.

Figure 4:
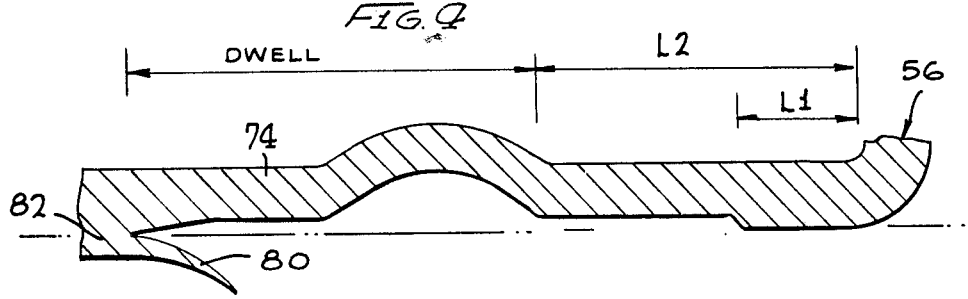
FIG. 4 is an enlarged side-elevational view, with parts broken away, of the preheater bar and the slitter knife of the slitter-sealer.

As indicated in FIG. 4, which is drawn to scale, heater pad 78 was first much longer, to the length L2 and, upon test, it was reduced in length until the proper amount of preheat was added to the advancing web. This length was determined experimentally, for particularly film web material, thickness and advance speed. In the particular case, the length L1 was determined to be most desirable. Of course, the amount of heat available for the preheat function is proportional to the length of the heating pad. When too much preheat is applied, the film web becomes too soft so that slitting is not properly accomplished; when too little preheat is applied, then too much heat must be added at the slitter bifurcated knife 82 which may result in overheating. It is also essential that there be a dwell time between the preheating and the slitting so that the heat conducted into the top surface of upper layer 22 has time to penetrate to the inter-face between the upper and lower film layers 22 and 24 where the sealing between the layers will take place. Accordingly, by this construction, preheating and effective sealing and slitting are accomplished.

Figure 6:
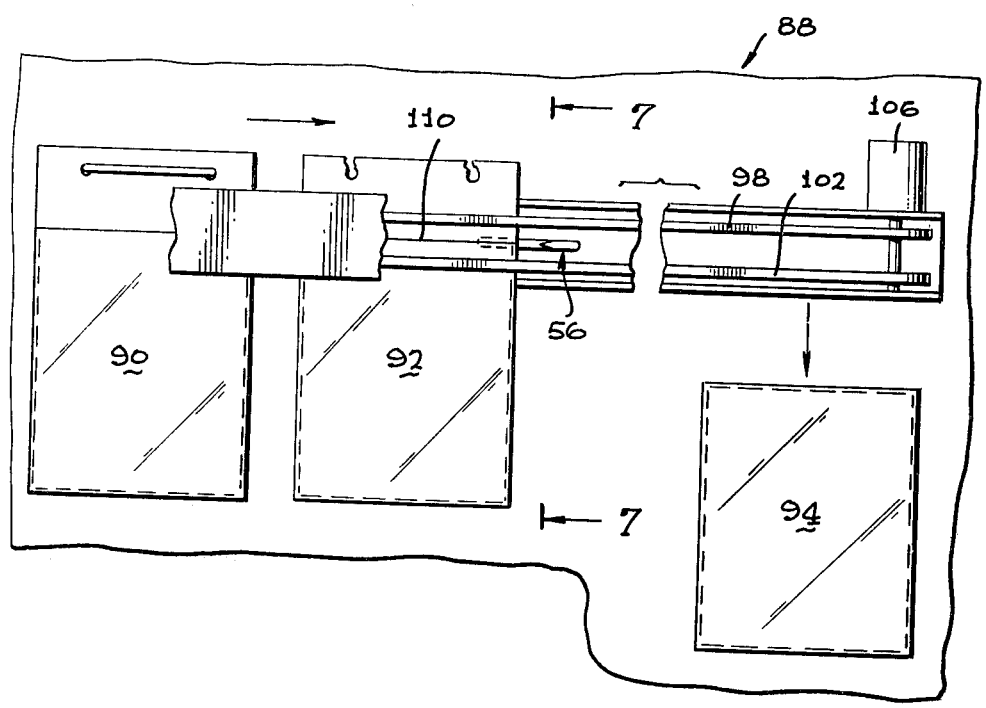
FIG. 6 is a side-elevational view, with parts broken away, of a filled thermoplastic polymer film bag-handling apparatus, showing the slitter-sealer apparatus of this invention employed to close the top of the bags.
Figure 7:
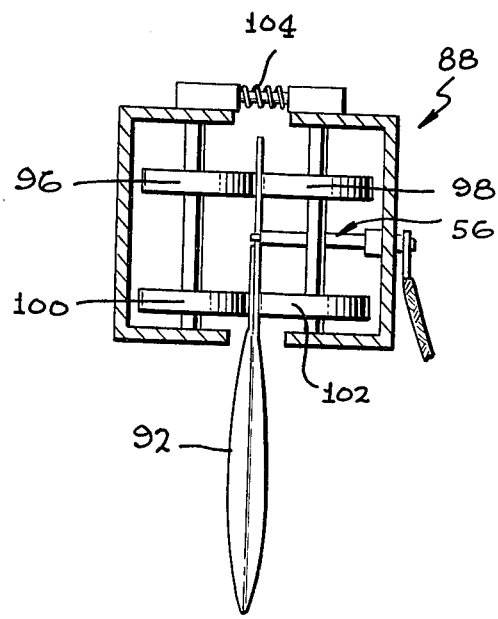
FIG. 7 is an enlarged section taken generally along the line 7—7 of FIG. 6.

FIGS. 6 and 7 illustrate another use for the slitter-sealer bar 56. In FIGS. 6 and 7, apparatus advances bags 90, 92 and 94 from and initial position (which may be a bag-manufacturing device or a bag storage device, such as a wicket), moves them through a bag-filling station, and finally moves them through the slitter-sealer station at which slitter-sealer bar 56 is located. Two upper conveyor bands 96 and 98 engage on opposite sides of the upper portion of the series of bags being advanced, and a pair of lower conveyor bands 100 and 102 engage against the advancing bags below the upper bands. The bands are urged together to resiliently engage on the bags (for example, by spring 104), and they are advanced (for example, by motor 106). In this way, the bags are advanced from station-to-station. As the bags approach the slitter-sealer staton, they are already filled and ready for the final sealing step.

Slitter-sealer bar 56 in FIGS. 6 and 7 has the same configuraton as the slitter-sealer bar 56 illustrated in the slitter-sealer embodiment of FIGS. 1 through 5. It is connected to a source of current so that the bar is resistance-heated to the proper temperature. A power supply controls the temperature of the slitter-sealer bar to preheat the advancing bags and to slit and seal them on line 110 to successively close the bags. As illustrated in FIG. 7, the slitting-sealing function is above the filled part of the bag, but below the wicketing holes so that the bags delivered out of the right-hand, discharge end of apparatus 88 are neatly finished and thoroughly sealed.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A polymer film slitter-sealer apparatus comprising:
    first means for advancing along a sealing line a plurality of layers of thermoplastic synthetic polymer film material lying next to each other;
    second means for preheating, slitting and sealing the polymer film along the sealing line as it advances past a preheating, slitting and sealing station; and
    third means for heting said second means;
    said second means comprising a heater bar having an integral preheater portion and an integral slitter-sealer portion positioned along the sealing line at a position the polymer film reaches after it passes said preheater portion.

2. The polymer film slitter-sealer apparatus of claim 1 wherein said preheater portion is spaced from said slitter-sealed portion so that there is a thermal soaking dwell time between polymer film contact with said preheater portion and said slitter-sealer portion.

3. The polymer film slitter-sealer apparatus of claim 2 wherein said slitter-sealer portion incudes a bifurcated knife and said preheater portion includes a heater pad.

4. The polymer film slitter-sealer apparatus of claim 1 wherein said third means is electric so that electric current passes through said heater bar to directly resistance-heat bar for heating both said preheater portion and said slitter-sealer portion together.

5. A unitary preheater-slitter-sealer bar for thermoplastic synthetic polymer film slitter-sealer apparatus comprising:
    a slitter knife portion for positioning along the path of motion of a plurality of layers of thermoplastic polymer film as the film moves along a line upon which slitting and sealing is to take place; and
    a preheater portion positioned to be in conductive thermal contact with the polymer film layer along the line at a position where preheating of the film is accomplished before film slitting by said knife.

6. The bar of claim 5 wherein said slitter knife portion is a bifurcated knife, said preheater portion is a heater pad, and said heater bar is heated by electric resistance heating by electric conduction through said bar.

7. The heater bar of claim 6 wherein
    said heater pad is spaced from said knife along the line so that there is thermal soaking dwell time between polymer film contact with said heater pad and polymer film slitting by said knife.

8. The method of slitting and sealing of
    juxtaposed plural layers of thermoplastic polymer film comprising the steps of:

advancing a plurality of juxtaposed layers of thermoplastic synthetic polymer film to be slit and sealed along a slit-seal line;

disposing a heater bar having a preheater portion and a slitter-sealer portion on the line; and heating the heater bar so that the preheater portion and the slitter-sealer portion are heated simultaneously and commonly so that the thermoplastic polymer film is preheated and subsequently slit-sealed on the line as it is advanced along the line.

9. The method of claim 8 wherein said heating step comprises passing an electric current through said heater bar for electric resistance heating thereof.

* * * * *